United States Patent [19]

Verdeau et al.

[11] Patent Number: 4,675,152
[45] Date of Patent: Jun. 23, 1987

[54] NUCLEAR REACTOR WITH CORE PARTITIONING BY BRACING RODS AND PLATES

[75] Inventors: Jean-Jacques Verdeau, Gif-Sur-Yvette; Jean-Claude Yazidjian, Bougival, both of France

[73] Assignee: Framatome & Cie., Courbevoie, France

[21] Appl. No.: 684,989

[22] Filed: Dec. 24, 1984

Related U.S. Application Data

[63] Continuation of Ser. No. 351,695, Feb. 24, 1982, abandoned.

[30] Foreign Application Priority Data

Mar. 13, 1981 [FR] France ................................ 81 05036

[51] Int. Cl.⁴ ............................................. G21C 15/00
[52] U.S. Cl. ..................................... 376/400; 376/287; 376/302
[58] Field of Search ............... 376/400, 399, 390, 389, 376/377, 302, 304, 285, 287

[56] References Cited

U.S. PATENT DOCUMENTS

| | | | |
|---|---|---|---|
| 3,215,608 | 11/1965 | Guenther | 376/302 |
| 3,466,227 | 9/1969 | Finch | 376/287 |
| 3,544,425 | 12/1970 | Shaw et al. | 376/302 X |
| 3,720,581 | 3/1973 | Kaser | 376/302 X |
| 3,753,856 | 8/1973 | Ash | 376/302 |
| 3,785,924 | 1/1974 | Notari | 376/400 X |
| 3,823,066 | 7/1974 | Thome | 376/400 |
| 3,987,860 | 10/1976 | Jabsen | 376/302 |
| 4,057,468 | 11/1977 | Lunt | 376/302 X |
| 4,111,747 | 9/1978 | Eck et al. | 376/287 |
| 4,135,974 | 1/1979 | Garkisch et al. | 376/302 |
| 4,146,430 | 3/1979 | Berringer | 376/302 X |
| 4,158,605 | 6/1979 | Cooper et al. | 376/400 |
| 4,462,956 | 7/1984 | Boiron et al. | 376/400 X |
| 4,560,531 | 12/1985 | Leroy | 376/302 |

FOREIGN PATENT DOCUMENTS

| | | | |
|---|---|---|---|
| 1593136 | 7/1970 | France . | |
| 2063022 | 7/1971 | France . | |
| 2168200 | 8/1973 | France . | |
| 2284957 | 4/1976 | France . | |
| 2484125 | 12/1981 | France | 376/302 |
| 1292431 | 10/1972 | United Kingdom . | |

Primary Examiner—Deborah L. Kyle
Assistant Examiner—Daniel Wasil
Attorney, Agent, or Firm—Pollock, Vande Sande & Priddy

[57] ABSTRACT

A nuclear reactor with juxtaposed prismatic fuel assemblies cooled by the flow of a liquid in a cylindrical jacket. A partitioning of the core between the peripheral assemblies and the jacket is constituted by rods parallel to the assemblies, guided laterally by bracing plates fast to the jacket in which the rods are free to slide longitudinally.

1 Claim, 5 Drawing Figures

NUCLEAR REACTOR WITH CORE PARTITIONING BY BRACING RODS AND PLATES

This application is a continuation of application Ser. No. 351,695, filed Feb. 24, 1982 now abandoned.

BACKGROUND OF THE INVENTION

The present invention relates to the construction of nuclear reactors in which the fuel elements constituting the core are cooled by the flow of a cooling liquid through the core, along individual elements arranged parallel to one another. It relates more particularly to means which permit partitioning of the core and thereby organization of the flow of cooling liquid or refrigerant, in order to avoid the appearance of preferential paths, detrimental to the efficiency, although the cross-section offered to the flow is not generally uniformly occupied by the fuel elements.

Thus in particular, in liquid cooled reactors, the fuel is in the form of rods grouped in assemblies traversed by the refrigerant fluid. The core is constituted by such juxtaposed assemblies, stowed close to one another, each assembly being prismatic, generally with a square cross-section. The periphery of the core then necessarily presents steps. The assembly is arranged in an enveloping skirt supporting the cores, which is, itself of cylindrical shape, or at least without corners, like the tank which contains the core and its appended equipment, bathed in the cooling liquid. Thus, between the peripheral assemblies and the enveloping skirt, there is an annular zone which is devoid of fuel.

PRIOR ART

To prevent the cooling fluid from flowing freely in this zone and to channel it to the core proper, it is known to use a partitioning structure which exactly mates the contour of the core. The fastening of this partitioning structure poses practical problems of construction which to date have never received satisfactory solutions. Partitioning plates can be fixed to transverse strengthening plates, or shapers, themselves, fixed to the cylindrical jacket of the core. However, it is not easy to devise a fastening method which meets the very strict requirements of dimensional accuracy, in this field, withstands the mechanisal stresses resulting from the temperature gradients which appear in the partitions and the strengthening plates, and withstands without damage the high neutron and gamma ray fluxes during the operation of the reactor. Fastening by screws is very sensitive to mechanical stresses and to the neutron flux, to the extent that the equipping of each screw with a special cooling system has been considered. Fastening by welding and dovetailing results in complications of manufacture and of mounting and in stresses due to the differential thermal expansions which render it hardly more acceptable.

SUMMARY OF THE INVENTION

It is an object of the invention to overcome these various drawbacks by partitioning in which the traditional vertical plates are replaced by rods which fulfill the same functions of channeling the cooling liquid flow, even in an improved manner, without posing the same problems of fastening, and which has the additional advantage of enabling the adaptation locally of the importance of their intervention in neutron attenuation between the core proper and the tank of the reactor, and thus assuring more effective protection of the tank against radiation.

According to the invention, there is provided a nuclear reactor with a core constituted by prismatic fuel assemblies juxtaposed inside a jacket limiting laterally the space traversed by a liquid for cooling the core flowing longitudinally in the assemblies, and comprising, between the peripheral assemblies and the jacket, bracing plates fastening to the jacket and rods parallel to the assemblies, mounted free to slide in the bracing plates.

The rods may be numerous and closely adjacent to one another, in several rows all around the core proper and closely following the stepped contour of the latter. They thus limit the transverse-currents in the flow of cooling fluid at the periphery of the core, which could cause vibrations or undercooling of the fuel of the peripheral assemblies. However, they still enable sufficient communication with the inner space of the core to assure pressure equilibration and, in the case of accidental loss of primary refrigerant fluid, enable the primary refrigerant fluid located between the jacket and the core to be removed at the same time as that which traverses the fuel assemblies. In this manner, the risks of distortion then run by conventional partitioning plates and which could result in disturbances in the cooling after such accident, are totally overcome.

Generally, the rods of the reactor according to the invention offer a simple solution to the problem of mechanical stresses, including those arising from differential thermal expansions. They are easy to place in position by insertion through the bracing plates, perforated for this purpose, and they slide freely in the longitudinal direction, i.e., in practice, the vertical direction of the fuel assemblies, both during their placement in position and then on their thermal expansion in operation. Only the bracing plates are rigidly fast to the casing, to which they are fixed, for example, by screws or by welding.

The rods are advantageously of cylindrical shape, thus passing easily into the corresponding circular orifices of the bracing plates. They are generally positioned in a regular step, triangular, square, or of any other shape, and relatively close-set, with for example, an interval between adjacent rods hardly greater than the diameter of the rods. They can be solid or hollow. They can be formed of any material adapted to the radiation conditions which exist around the core, for example, of stainless steel or of a zirconium alloy, and preferably of a material having a high coefficient of neutronic reflection. It is possible, for example, to constitute the rods in the form of metal tubes containing a reflector material such as beryllium.

In addition to their role in the circulation of the refrigerant, these rods protect the tank of the reactor from neutronic radiation and from the gamma radiation produced in operation by the nuclear fuel. From this point of view, it is advantageous to vary the number of rows around the core, i.e., the numerical density of the rods in the radial direction, so as to compensate for the variations in the distance between peripheral assemblies and the tank to assure sufficient attenuation everywhere of the radiation before it reaches the tank.

In a preferred embodiment of the reactor according to the invention, the cross-bracing plates holding the rods laterally are arranged at the same horizontal levels as the grids of the fuel assemblies positioned at different levels over the height of these assemblies, and they are shaped so that all around the core, their inner contour follows the outer contour of the grids of the peripheral assemblies of the core. If the cross-bracing plates of the reactor according to the invention about against the grids of the peripheral assemblies through their inner contour, this permits, in the case of cross-stresses of the core, due, for example, to an earthquake, the peripheral fuel assemblies to be urged through their grids onto the cross-bracing plates, which thus contributes to the overall strength of the reactor in this type of occurence.

Besides the passage orifices of the rods, the cross-bracing plates preferably include other perforations which permit a certain flow of refrigerant fluid vertically between the core and its jacket. The pressure drop of the refrigerant fluid which thus passes around the core can be regulated by the number, the arrangement and the dimensions of said perforations. It is thus possible to assure that for a by-pass flow rate which is generally of the order of one-hundredth of the principal flow rate which actually passes through the core, the pressure drop undergone by the by-pass refrigerant fluid on passage through each cross-bracing plate is of the same order of magnitude as the pressure drop of the refrigerant fluid of the principal flow on passage through the fuel assembly grids placed at the same level. Certain of the perforations are advantageously vertical holes pierced in the cross-bracing plates located between the jacket of the core and the rods, while others are indentations on the inner periphery of the cross-bracing plates.

BRIEF DESCRIPTION OF THE DRAWINGS

Other features of the invention will emerge from the description which follows, which relates to a particular embodiment of a nuclear reactor with cooling by light water with core partitioning according to the invention. The description refers to FIGS. 1 to 5 of the drawings, in which.

DETAILED DESCRIPTION

Figure 1:
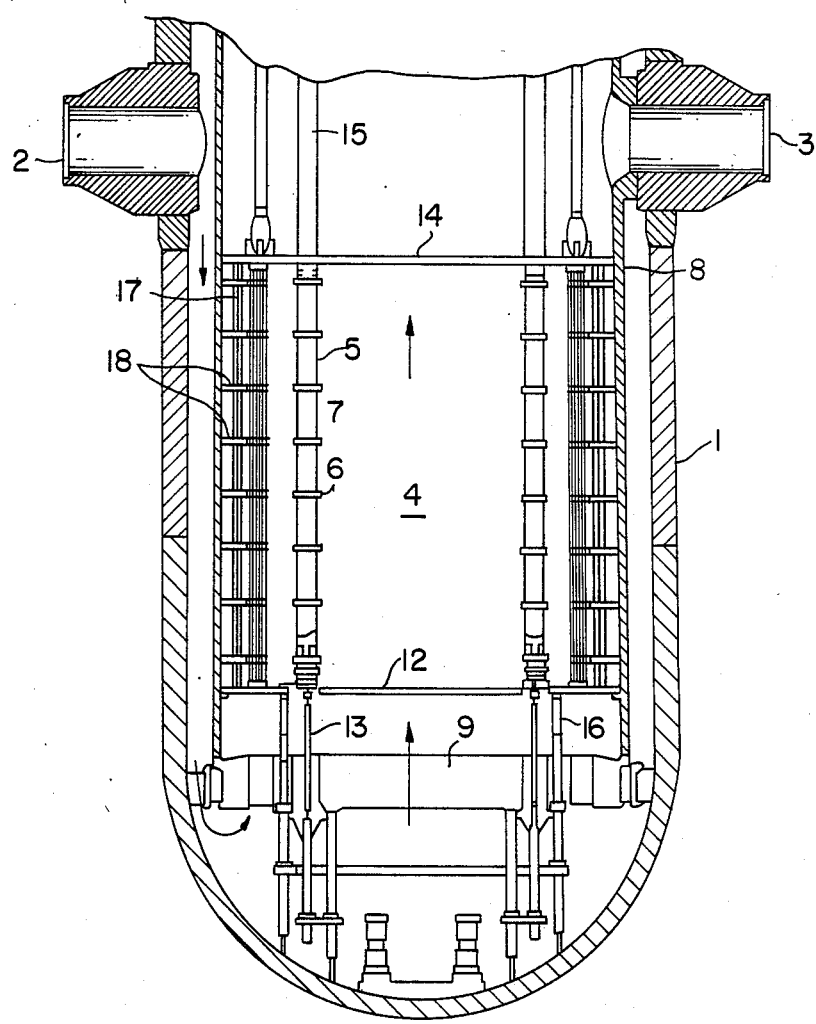
FIG. 1 shows a partial view of the reactor in vertical section.

FIG. 1 shows schematically the whole of the reactor, enclosed in a tank 1, provided with pipes 2 and 3, respectively for the inflow and outflow of the primary refrigerant fluid which assures the cooling of the core 4 in operation. This core is composed of vertical fuel assemblies 5, each constituted by fuel rods 7, held laterally with respect to one another by the grids 6 at different levels.

Figure 3:
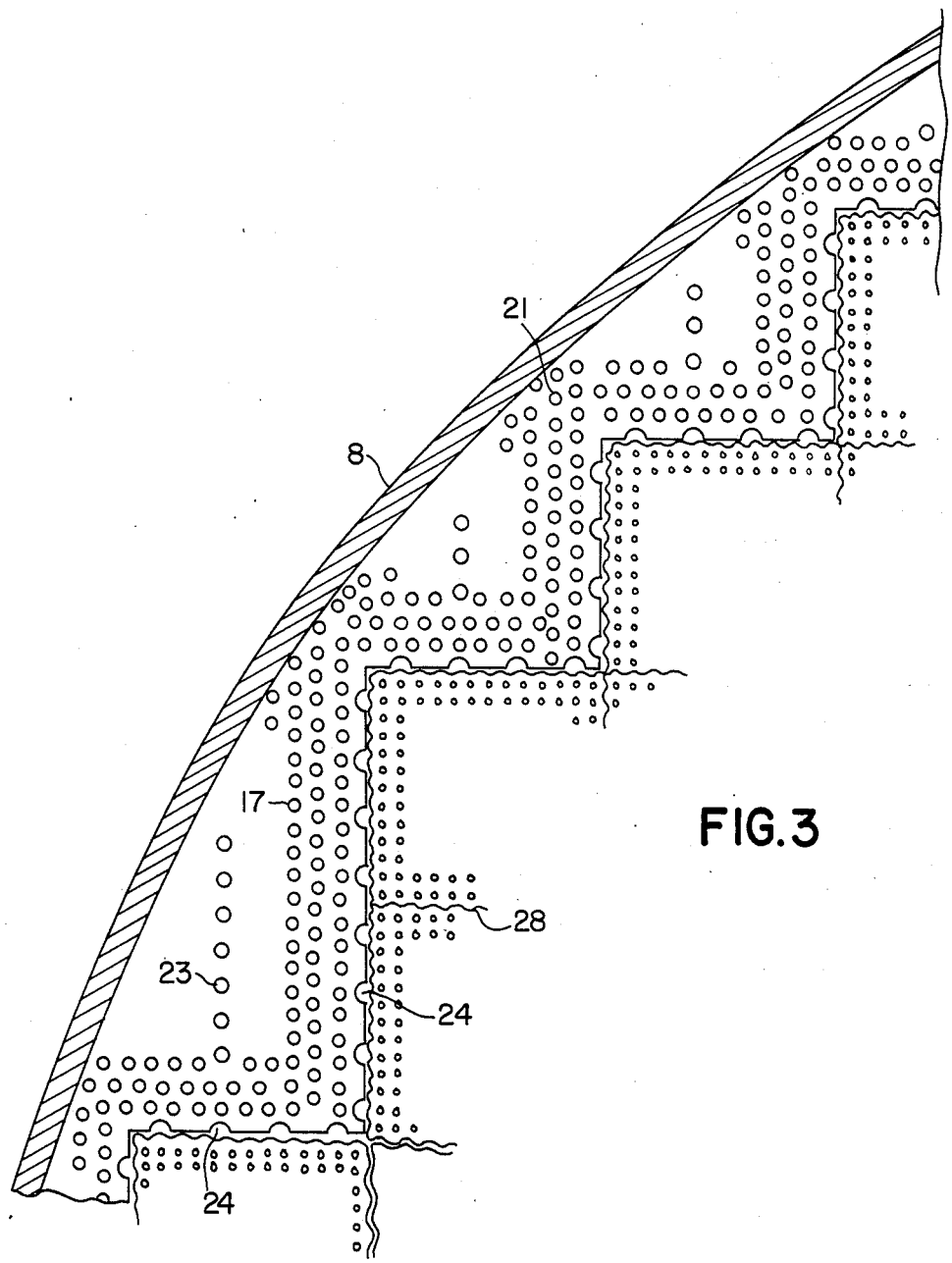
FIG. 3 shows these elements in horizontal section at the edge of the core, with a cross-bracing plate viewed from above.

The assemblies are of square cross-section and they are juxtaposed close up to one another, as is shown by the cross-section in FIG. 3. The whole is positioned inside a cylindrical jacketing skirt 8, which with a support base 9 carries the whole core, suspended through it on the top flange of the tank. The inflow pipes 2 for the refrigerant fluid open into the tank 1 outside the jacketing skirt 8, the outflow pipes 3 on the inside. The flow which is established in operation thus includes a descending path in the annular space between the tank 1 and the enveloping skirt 8, followed by an ascending path through the support base 9 and the core 4.

FIG. 1 also shows the lower plate 12 of the core, the instrumentation columns 13 of the core 13 and the upper internal equipment which comprises the upper plate 14 of the core and the guide tubes 15 of the control clusters. The fuel assemblies 5 extend from the lower plate 12 to the upper plate 14. The lower plate, bearing the assemblies, rests on the support base 9 through columns 16, while the upper plate rests directly on the assemblies through the weight of the upper internal equipment and the tightening of the tank cover. Both are pierced by numerous holes, through centering of the fuel assemblies and for the passage of the cooling water. There are also rods 17 which extend like the fuel assemblies vertically between the core plates 12 and 14 and the cross-bracing plates 18 in which the rods are mounted with light friction.

Figure 2:
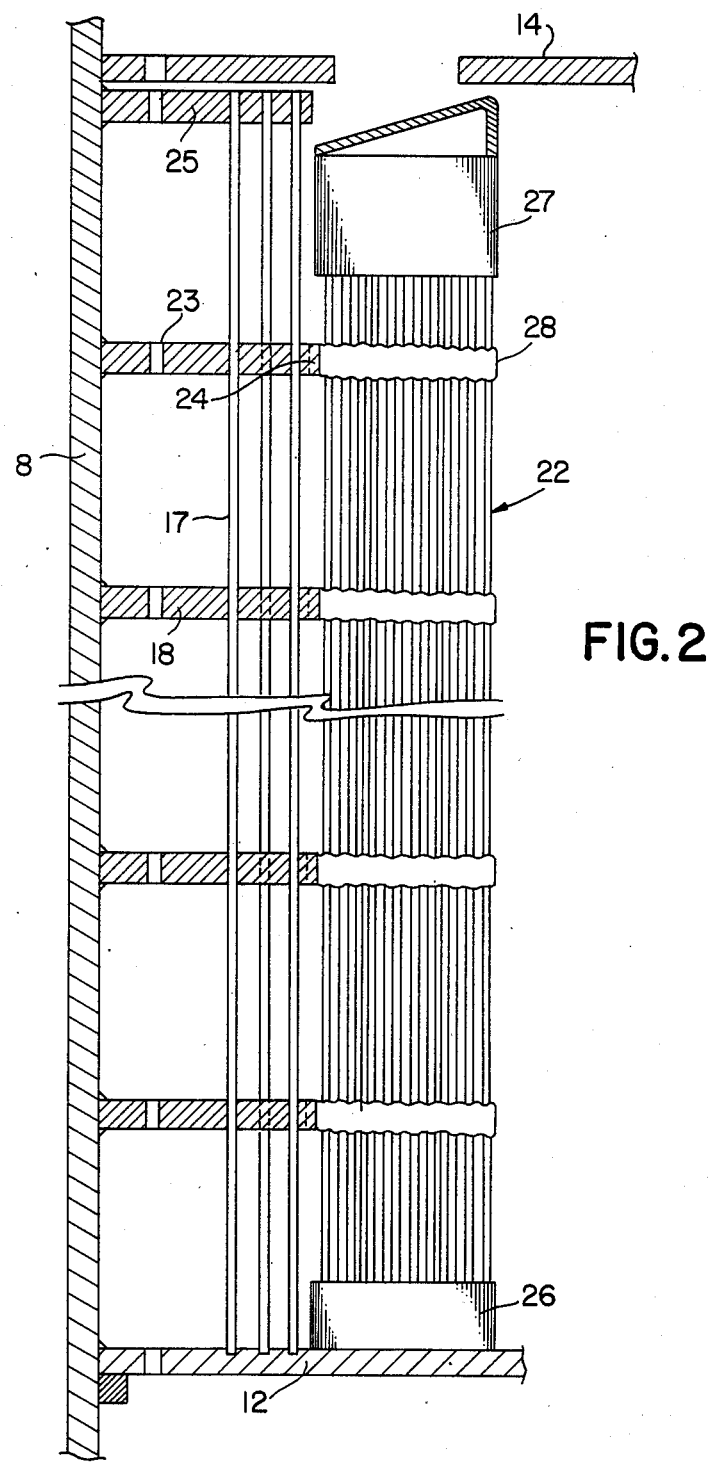
FIG. 2 shows a first embodiment, in vertical section, of elements which form the partitioning of the core.

The arrangement of the rods appears more clearly in FIG. 2, in a vertical radial plane of the reactor, and in FIG. 3 which shows their distribution in cross-section (horizontal). The shape and arrangement of the cross-bracing plates also appear from these figures.

FIG. 3 illustrates how the prismatic shape of the juxtaposed fuel assemblies gives the core a stepwise outer contour. It is essentially along this contour that the rods 17 are distributed in three rows and in a triangular step in the illustrated embodiment. Opposite the corners pointing outwardly, additional rows of rods 21 are provided, against the jacketing skirt, reinforcing the thermal protective function with respect to the tank.

The rods 17 are of cylindrical shape and solid. They are embedded through their lower ends in blind holes provided for this purpose in the lower core plate 12. The latter bears the weight of the rods like it bears that of the fuel assemblies. FIG. 2 shows a peripheral assembly 22, resting on the lower core plate 12 through its lower end-piece 26, while through its upper end-piece 27 it is held on the upper core plate 14, which permits however the passage of the vertically movable control clusters in the assemblies 5. The upper ends of rods 17 come into abutment with the upper core plate once the latter is in position. Provision is however made for a certain tolerance thermal expansion of the rods.

The bracing plates 18 guide the rods in their vertical movements. Several of them are provided, at different levels of the core, and in particular one is located at each of the levels where the fuel assemblies comprise a transverse grid. Each bracing plate runs annularly around the core, in several sectors welded to one another. Along its outer periphery, which is circular and of radius corresponding to the inner diameter of the enveloping skirt 8, it is fixed to this jacket, by welding in the case shown. Its outer contour has steps complementary to those of the outer periphery of the core, which it follows very closely at all points, as it were, supported on the grids 28 of the peripheral assemblies, situated at the same level.

The bracing plates are all identical, which facilitates their construction. They are not only performated at the plate of the passage of the rods also include, holes 23 distributed in the spaces comprised between the rods 17 and the jacketing skirt 8, as well as semi-circular indentations 24 on their inner periphery. Similar holes are formed respectively through the lower plate 12 and the upper plate 14 of the core. At the top of the core, a last bracing plate 25 is arranged at the level of the upper end pieces of the fuel assemblies, just beneath the upper plate 14, which is solid in its part situated above the rods 17. The total length of the rods is such that their ends are normally located in the thickness of the last bracing plate 25. This permits their thermal expansion before they come into abutment with the lower surface of the upper core plate. Springs (not shown) can be mounted at the head of the rods 17 to avoid their vibrating under the effect of the circulating refrigerant fluid. In all cases the upper plate retains the rods like the fuel assemblies against dislocation under the thrust of the refrigerant fluid.

The choice of the diameter and spacing of the rods 17 and of the holes and indentations 24 determines the flow conditions of the refrigerant fluid in the vicinity of the core. The assembly thus realizes what is called the partitioning of the core, by limiting exchanges by communication between the core proper and the annular by-pass zone between the core and its jacket, not preventing completely but permitting only a small by-pass flow and permitting in this zone around the core a vertical circulation which can be retarded just enough to create substantially the same pressure drop on passage through the bracing plates in the by-pass zone as in the passage through the grids of the fuel assemblies.

In the embodiment of FIGS. 2 and 3, the role of the partitioning of the core is developed essentially in three continuous rows of rods, which have a diameter and a spacing which can be greater than those of the fuel rods in the assemblies, but are of the same order of magnitude. The additional rods 21 facing the protecting corners of the core assure attenuation of the radiation complementary with that of the three rows.

Various advantages of this construction have already been indicated. It should be recalled that the mounting of the rods does not involve any fastening, that these rods are easy to produce by drawing, that they do not require special machining, and that the bracing plates are also easy to construct by perforation of plates identical with one another. The mounting of the rods enables their free expansion, with respect to the bracing plates and with respect to the jacket of the core. At most, the differential expansion between the rods and the jacket remains small since the average apertures of the rods and of the jacket remain adjacent; the rods are certainly subject to a higher gamma flux, but they are in practice less thick than the jacket, and hence better cooled. Finally, it is possible to inspect the condition of the partitioning periodically by spot-checking some rods after dismounting the upper internal structures and, if necessary, to replace certain rods.

Figure 5:
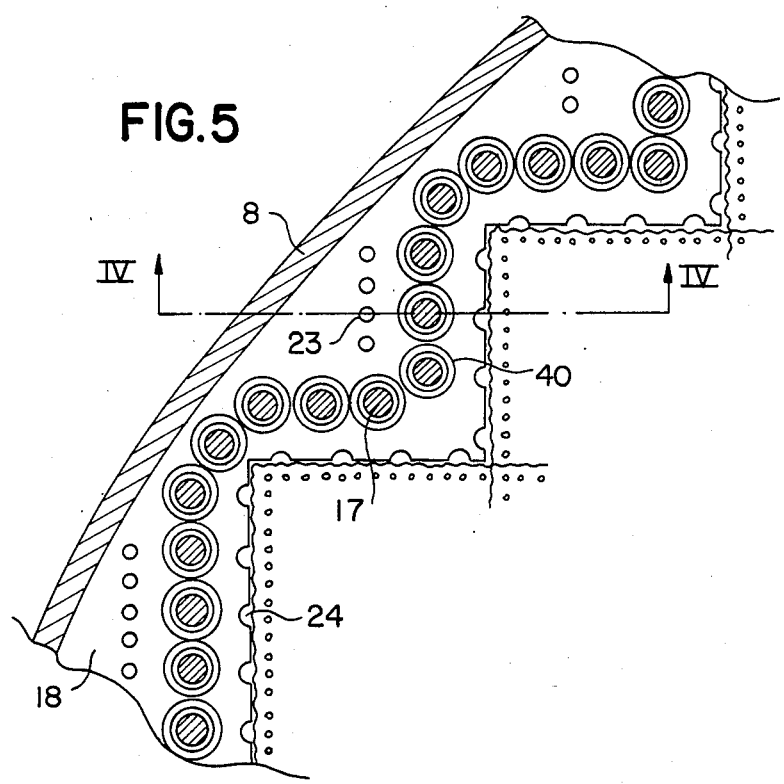
FIGS. 4 and 5 show a second embodiment in a manner similar to for a second embodiment.
Figure 4:
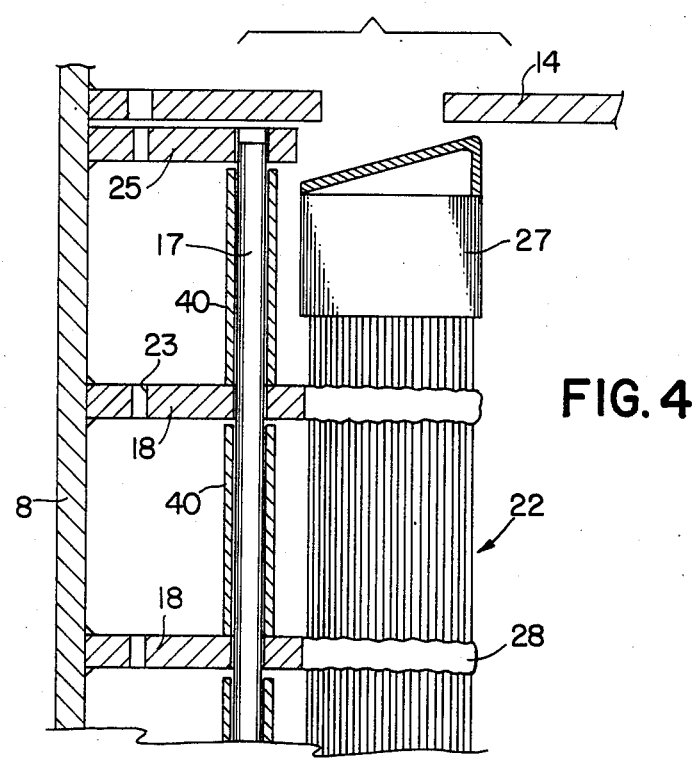

Most of these advantages are also present in the embodiments of FIGS. 4 and 5, in which the rods 17 are inserted coaxially in bracing tubes 40, each of which is intercalated vertically between two successive bracing plates 18. These tubes enable the space between the rods to be reduced and hence hydraulic exchanges between the core and the annular zone to be further reduced. The bracing tubes 40 are constituted of a material identical with that of the rods. They are supported on the bracing plates 18 on which they are mounted freely. The plays existing between the tubes 40 and the rods 17 on the one hand, and the bracing plates 18 on the other hand, enable their free expansion. In the embodiment shown, the tubes are tangential with one another. This arrangement enables only a single row of rods to be provided instead of the three continuous rows of the embodiment of FIGS. 2 and 3. It only remains for the supplementary rods to be provided facing the projecting corners of the contour of the core.

We claim:
1. Nuclear reactor comprising
  (a) a vessel;
  (b) a cylindrical vertical core barrel terminating short of the bottom of said vessel, defining with said vessel a descending path for a reactor coolant;
  (c) a core located inside said core barrel, having a stepped contour, constituted by juxtaposed prismatic fuel assemblies arranged for upward circulation of said reactor coolant therein;
  (d) a plurality of horizontal bracing plates located at different levels, fast with said core barrel formed with perforations for a small flow of current bypassing said core and terminating in close proximity to said core along said stepped contour; and
  (e) at least one row of vertical rods arranged adjacent to each other around said core, extending throughout the vertical length of said core, following closely said stepped contour, and retained in said bracing plates, each of said vertical rods being slidably received in a set of aligned bracing tubes each located between two adjacent bracing plates, and the bracing tubes of two adjacent sets being mutually tangent;
  (f) said nuclear reactor being devoid of baffle means other than said rods and said bracing plates for restricting horizontal radial coolant flow toward or away from said core barrel.

* * * * *